Figure 1:
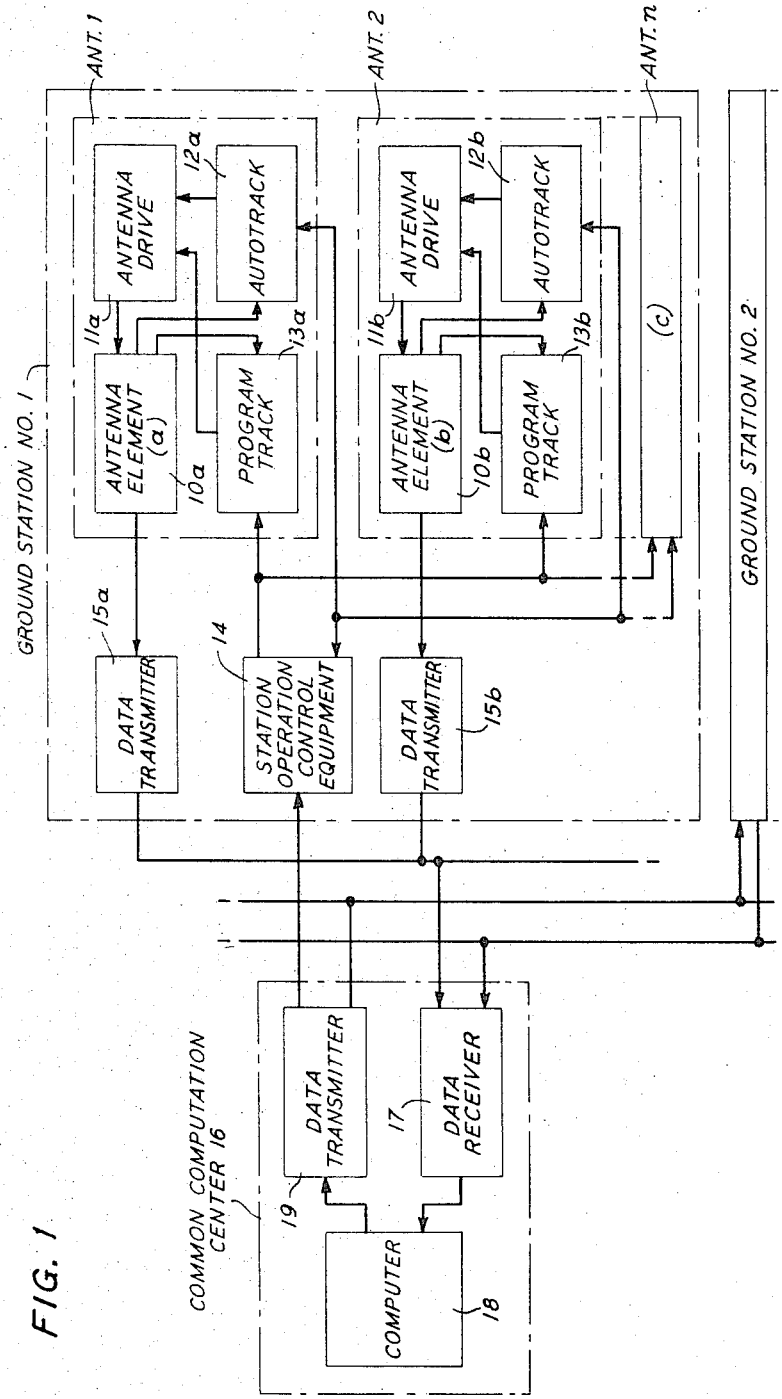

INVENTORS H. P. KELLY
W. A. KLUTE
BY
ATTORNEY

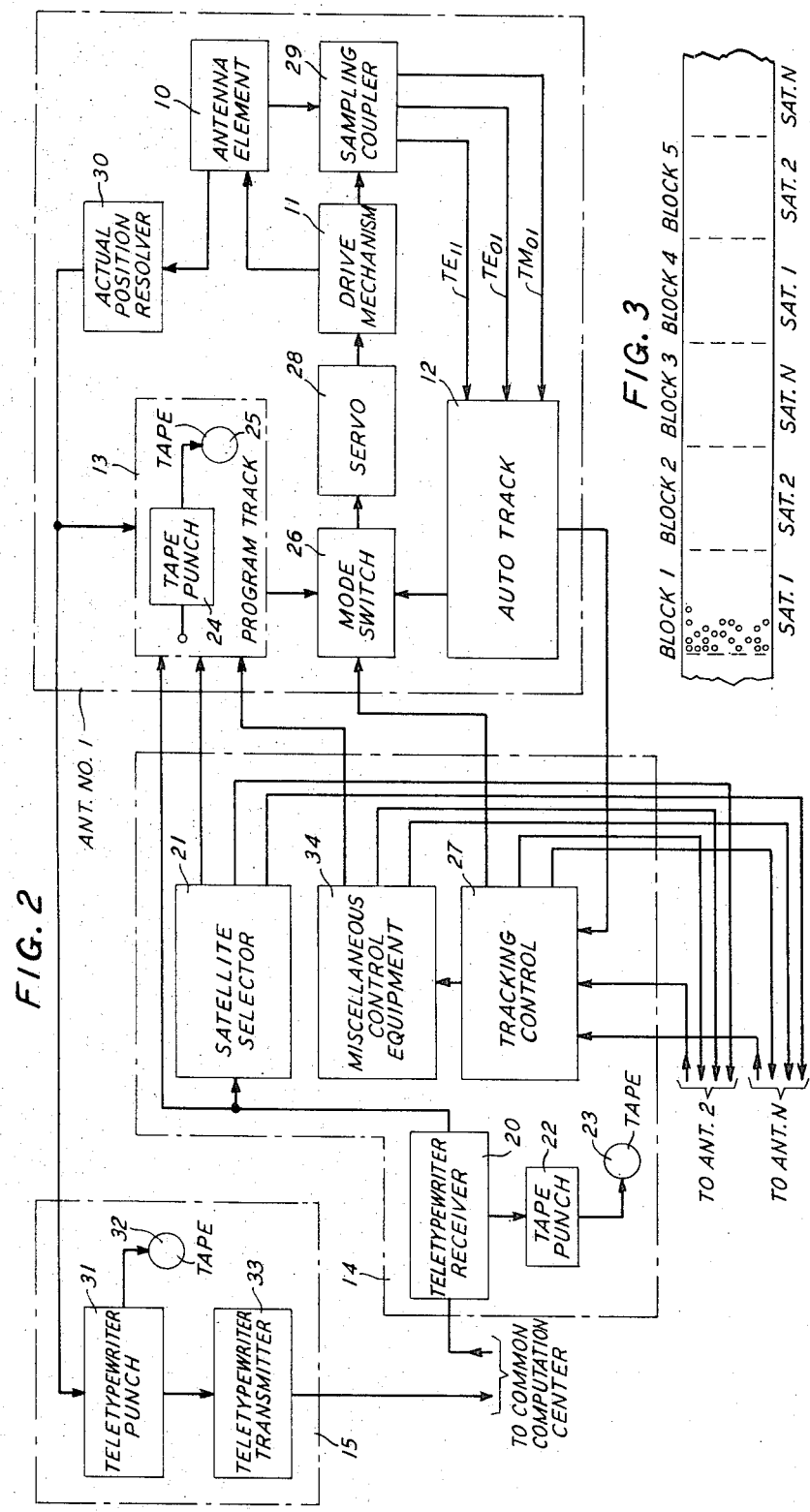

United States Patent Office 3,349,403
Patented Oct. 24, 1967

3,349,403
GROUND STATION ANTENNA POINTING SYSTEM
FOR SATELLITE COMMUNICATIONS
Hugh P. Kelly, New Providence, and Walter A. Klute, Mountainside, N.J., assignors to Bell Telephone Laboratories, Incorporated, New York, N.Y., a corporation of New York
Filed Apr. 29, 1965, Ser. No. 451,869
8 Claims. (Cl. 343—117)

This invention relates to antennna pointing systems and more particularly to control systems employed for directing ground station antennas toward communications satellites in orbital range of the ground station. It has for its principal objects an increase in the flexibility with which satellite tracking and communications functions are carried on between a number of geographically separated ground stations, and a reduction in the complexity of the control equipment at each of the ground stations.

The antenna pointing system employed at the ground tracking station of a satellite communications system performs two primary functions. Initially, it establishes the communications connection between the ground station and a satellite by causing the communications antenna at the ground station to acquire and continuously track the satellite. It then provides means for determining the satellite orbit so that pointing instructions may be generated to help meet the requirements of the first function.

These functions may be carried out in a number of ways. For example, a fully programmed control system may be used. Past or predicted emphemerides are used to energize a servo system which moves the antenna. New data are collected during tracking and used for the computation of new ephemerides. Alternatively, the ground station antenna may be made self-tracking. Once the satellite is acquired by any means, optical sighting, radar, or the like, the antenna station utilizes beacon signals generated in the satellite and transmitted to the ground for developing antenna pointing signals. In essence, the nature of propagation of received beacon signal is analyzed to develop error signals indicative of the direction the antenna is pointing with relation to the direction the antenna should be pointing.

Experience has shown that self-tracking, commonly called "autotrack" control, is preferred as the primary tracking mode for an operational ground station antenna. This mode, which locks the antenna to a signal source in the satellite, provides better accuracy of pointing and higher reliability at lower cost than the programmed control in which the antenna is controlled in advance from a computed ephemeris. However, it has been found that even with autotrack operation, some programmed control capability is desirable since an antenna must be pointed so that the satellite is within the beam width of the antenna before the autotrack system can acquire the satellite. The accuracy of pointing necessary for this acquisition function is considerably less than would be required to track entirely on a programmed basis. A simplified programmed control system can also be used to enhance the reliability of a system in which autotrack is the primary tracking mode. Thus, if for any reason the autotrack system loses its lock on the satellite, even momentarily, the satellite may be reacquired through the action of a programmed tracking system. Programmed control is also desirable in the administration, or programming, of a ground station which employs several independent antenna systems. Further, assignment, acquisition, handover, and maintenance may be performed automatically, thus minimizing the personnnel required to operate the station.

In a communications system in which a number of geographically separated ground stations simultaneously track the same satellite repeater, program data generated at one location may be used, with due regard for the coordinate base employed, at each of a number of tracking stations. Since the generation and storage of such data require the largest outlay in equipment and maintenance, such a simplification of the computing function ordinarily required at each ground station is desirable.

In accordance with the present invention, antenna pointing data for each ground station of a multistation system are developed at a single computing center and supplied to each of the stations. Actual antenna pointing information, generated at each station during the tracking of one or more satellites, is in turn supplied to the computing center where it is employed to develop pointing data for future use by each of a number of independent antennas at the station. Typically, each antenna is equipped with its own autotrack and servo drive systems.

Computed program data useful in autotrack backup and similar operations are delivered, in accordance with the invention, to and from each ground station by way of a low cost data transmission system. For example, teletypewriter transmission may be employed to deliver data acquired during the tracking of a satellite to the common computation center, and for delivering computed antenna pointing data for each of a number of antennas to each ground station. These latter data may be corrected from time to time, as required, either from autotrack data locally generated, or from reprocessed data from the computation center.

Preferably, the teletypewriter data are contained in blocks of information which define for a time, the position of a specified satellite at that time, and the velocity of the satellite at that time. For example, if $n$ satellites in the system are usable at any ground station, $n$ consecutive blocks of information are delivered to the ground station. Each block defines the position of one of the satellites at one time, preferably with relation to one ground station only. Blocks of information for each antenna at the station are selected at the ground station and delivered to the appropriate antenna tracking equipment. Tracking signals are then locally generated by interpolating between the position data at the selected instant. In essence, the local program tracking equipment interpolates from each defined position in one block to the position defined in the next block. Great flexibility is thus afforded even though a minimum of computation is performed at each ground station. Data transmission is additionally simplified since a relatively short transmission interval, on the order of a fraction of an hour, may be used to control each ground station for a much longer period.

The invention will be more fully apprehended from the following detailed description of an illustrative embodiment thereof taken in connection with the appended drawings, in which:

FIG. 1 is a block schematic diagram of a satellite communication system, in accordance with the invention, which employs a common computation center and a number of independent ground stations; and FIG. 2 is a block schematic diagram of the data processing and antenna control apparatus typically employed at each ground station of the system.

A multistation tracking system for a communications satellite network is illustrated in FIG. 1. The several ground stations, of which station numbers 1 and 2 only are shown, are generally spaced geographically apart. Ground station number 1 is typical of the others; it may include several independent antenna systems, e.g., 1 through $n$, each individually controlled. Antenna system 1 includes, for example, antenna element 10, which may be of the horn-reflector or Cassegrain type. Antenna 10 is trained on an orbiting satellite by an antenna drive system, 11, which includes conventional servo drive apparatus. Autotrack apparatus 12 and program track apparatus 13 receive actual pointing direction signals from antenna 10 and utilize them, together with previously computed data, for generating signals for actuating the antenna drive system. Pointing direction signals from the antenna are also supplied to data transmitter 15. The several elements of the antenna system, including the autotrack drive system and antenna element, may be generally of the type described fully in the Bell System Technical Journal for July 1963. The program track equipment, preferably, is of the type described in detail in a copending application of E. J. Reid, Ser. No. 451,868, filed Apr. 29, 1965, now Patent No. 3,316,552, granted Apr. 25, 1967. Data transmitter 15 may be a teletypewriter transmitter.

Data from transmitter 15 is forwarded at any convenient time to common computation center 16, which may be located at any desired location. Preferably, it is located at a site central to all of the stations but is not necessarily associated with any one of them. Data received at the computation center via data teletypewriter are supplied to computer 18. Computer apparatus suitable for the analysis of satellite tracking signals, and for the development of pointing signal data for current and future satellite orbital positions, has been described fully in the literature, for example in the above-mentioned issue of the Bell System Technical Journal.

Computer 18 analyzes the data received from all of the ground stations during tracking of all of the satellites in the communications system. It is programmed to develop individual tracking signals for selected future times for each of the ground stations and, preferably, does so for each of a number of satellites of the system. At some time, convenient to the operation of the computer center and to the operation of each individual ground station, these data are supplied in individually addressed blocks to teletypewriter transmitter 19 for transmission to each ground station. Station operation control equipment 14 at each ground station is equipped with a teletypewriter receiver which converts received data into punched paper or tape form and, as required, forwards the data to the tracking apparatus of each antenna system of the ground station. Conveniently, the punched tape may be stored for use during subsequent passes of the satellite without a need for transforming it into another storage form, e.g., magnetic tape or punched cards.

It is apparent that common computation center 16 serves a great number of individual ground stations. Heretofore, the function of the computing center was filled by individual computing apparatus at each ground station. It has been found, however, that the high operational speed of a typical ephemerides computer allows it to be used for a great number of individual computations. Accordingly, removing it from the ground station location both simplifies the operation of each ground station, and permits tracking data from a number of widely spaced stations to be processed together and as required, to be correlated for error checking and the like.

The organization of elements at one of the ground stations is shown in somewhat greater detail in FIG. 2. Tracking and control data are received from common communications center 16 via transmission lines which terminate, for example, in teletypewriter receiver 20. Here the data are converted, as required, into electrical signals which are supplied directly to program track equipment 13 at an antenna No. 1. The signals are also supplied to satellite selector apparatus 21, which is a part of operation control equipment 14, and to tape punch apparatus 22. By means of the auxiliary tape punch, a permanent tape record, e.g., 23, may be prepared for storing the received data. If desired, the direct connections between receiver 20 and the program track and selector networks may be eliminated, and the tape 23 may be utilized as the input stores of data for these elements. Typically, program track apparatus 13 utilizes a tape punch 24 for preparing a tape record 25, which in turn is read out as required for developing a tracking program. Such is the case with the program track system described in the above-mentioned copending application of E. J. Reid.

Antenna No. 1, the only one of several similar directive antenna systems shown in FIG. 2, additionally includes an autotrack system 12 which develops tracking information from information received from a satellite. In a typical system, the autotrack data are employed as a source of primary tracking information, with the data from the program track apparatus being used as a backup. Tracking information from both of these units is continuously supplied to mode switch 26. Tracking information from one or the other of the two sources is supplied to servo apparatus 28 in accordance with a control signal supplied from tracking control 27. In turn, the servo apparatus controls drive mechanism 11 associated with antenna element 10. Accordingly, antenna element 10 tracks the satellite continuously so that communications may take place. It is evident that the tracking operation is essentially the same for both a high altitude synchronous satellite and for a medium altitude subsynchronous satellite. The communications channel equipment may be of any desired form; it is not shown here because it forms no part of the present invention.

Information received from the satellite is supplied by the antenna element to sampling coupler 29 wherein information indicative of the satellite position with relation to the pointing direction of the antenna is separated from the communications message signals received from the satellite. In practice, the sampling coupler separates the several modes of propagation of the received signals, the $TE_{11}$, $TE_{01}$, and $TM_{01}$ modes for example, and delivers them individually to autotrack apparatus 12.

Actual position resolver 30 responds to the momentary pointing position of antenna element 10 (which evidently corresponds to the actual direction of the radiating satellite), in order to develop signals which identify the momentary antenna position. These signals are supplied both to program track apparatus 13 at the antenna location, and data transmitter 15. In the data transmitter, they are supplied to teletypewriter transmitter 33, and, if desired, are converted by teletypewriter punch 31 into a tape record 32. The information may thus be supplied at any convenient time by way of a teletypewriter circuit to the common communications center. Actual position resolver apparatus 30 may be of the form described in the above-mentioned Bell System Technical Journal citation.

Since a satellite communications system generally employs a number of satellites, a number of which may be used for a given transmission, it is in accordance with the invention to transmit information for each of the satellites in the system during each transmission of data to the ground stations. Accordingly, blocks of information are transmitted in sequence to each ground station. Each block contains information valid at specifically defined future instants, for example, at twelve minute intervals, concerning the position of a particular satellite. Thus, each block specifies a time, the position of a specified satellite at that time, and the velocity of the satellite. The particular satellite involved is identified by an address code included in the block.

FIG. 3 illustrates a typical sequence of blocks on the tape prepared by the teletypewriter receiver. In the example, block 1 is addressed for satellite No. 1 at a particular time, e.g., $t_1$, and includes position and velocity data. Block 2, addressed for satellite 2, contains similar information for time $t_1$; block 3 addressed to satellite N, contains the data for satellite N for time $t_1$. Block 4 is addressed for satellite 1 and is valid at time $t_2$, block 5 is directed to satellite 2 at time $t_2$, and so on. Great flexibility is thus afforded since the tape contains sufficient information to permit pointing signals to be developed at each ground station for each individual antenna which might be used during the tracking operation. Hence, any satellite may be tracked at any time by any antenna at the ground station by virtue of the information on the received tape. This relieves the computation center of the necessity of preparing individual tapes for each antenna and for each satellite which may be tracked by that antenna.

Preferably, the common computation center relates individual blocks of information, pertaining to the several satellites in the system, to the geographic location of each ground station. That is to say, individual blocks of information for each satellite at specific future times are developed at the center for each ground station using the geographic location of the ground station as a coordinate base for the pointing information. Even though an appreciably greater transmission time is required for delivery of such data, the generally short transmission time for delivering data for selected future times only, makes this mode of operation not only feasible but extremely desirable; it relieves the ground station of the necessary coordinate transformation operation.

Alternatively, the ground station may assume the responsibility for transforming universal data, supplied by the computation center, to its particular geographic location. In this event, the common computation center develops blocks of information pertaining only to the position and velocity of each satellite in the system at specified times. Each station individually operates on these data, translates the position information to a coordinate base suitable for its location, and then carries out an interpolation operation to prepare individual antenna direction signals.

Since each block of information is individually addressed, the station operation control 14 at each ground station may select the appropriate blocks of information for the satellite being tracked by that station. Antenna satellite selector 21 (returning again to a discussion of FIG. 2) performs this function. Blocks of received data are supplied to selector 21, which, in turn, identifies each block from the address and enables the appropriate program track apparatus at the station. When enabled, the program track equipment accepts the corresponding block of information and from it, by a system of interpolation, develops the necessary tracking information for a particular antenna.

Mode switch 26 is employed to establish the momentary tracking mode. Ordinarily, autotrack is used; during the acquisition phase and in the event of a loss of track, program track is employed. Tracking control 27 accordingly monitors continuously the error signal output of autotrack apparatus 12. So long as error signal information is being produced by the autotrack equipment, mode switch 26 is allowed to supply this information to the drive system. When autotrack error information is not issuing from the autotrack equipment, program track information from apparatus 13 is supplied to the drive system. Autotrack data from each of the several antennas at the ground station are similarly monitored in tracking control 27, and the mode switch associated with each antenna is controlled by a signal developed by the control unit.

As an aid to autotrack acquisition of a radiating satellite, a variety of antenna maneuvers may be employed. For example, an antenna may be instructed to follow a generally spiral pattern, or it may be offset in order to correct for parallax or similar distortions, or both of these and other similar scanning patterns may be used. Such additional tracking control signals are developed in control unit 34 and are supplied, as called for, to program track apparatus 13. Since this operation is a function, essentially, of the autotrack system, autotrack information is supplied to control apparatus 34, preferably after it is monitored by tracking control 27. Suitable circuits and equipment for these operations are fully disclosed in the above-named reference.

From the foregoing, it is apparent that the ground station control system of the present invention minimizes the operational controls required at each individual ground station and permits a single computation center to serve a number of geographically separated ground stations. By use of a "block" system of teletypewriter data transmission, the cost of transmission of data between the computation center and each ground station is reduced to a minium. Finally, since teletypewriter tape constitutes a permanent storage medium which may be read out at any desired time and as often as desired, the auxiliary storage facility at each ground station is considerably simplified.

The above-described arrangements are, of course, merely illustrative of the application of the principles of the invention. Numerous other arrangements may be devised by those skilled in the art without departing from the spirit and scope of the invention.

What is claimed is:

1. An antenna pointing system which comprises: a station equipped with at least one tracking antenna, means for pointing said antenna in response to applied control signals, means associated with said antenna for developing signals indicative of the momentary pointing direction of said antenna, a computation center; means for supplying said computation center with said momentary pointing direction signals, means for supplying said computation center with signals indicative of a desired pointing direction for said antenna, means at said computation center responsive both to said momentary and to said desired pointing direction signals for developing data signals which define for specified future instants the required pointing direction for said antenna to achieve said desired pointing direction, means for periodically supplying said data signals to said station, means at said station for interpolating between said required pointing directions defined for said specified future instants to produce control signals which define at other selected times the required pointing direction for said antenna, and means for supplying said control signals to said antenna pointing means.

2. An antenna pointing system which comprises: a plurality of stations, each equipped with at least one tracking antenna, means for individually pointing said antennas in response to individually applied control signals, means associated with each of said antennas for developing signals indicative of the momentary pointing directions of said antennas, a computation center; means for supplying said computation center with all of said momentary pointing direction signals, means for supplying said computation center with signals indicative of a desired pointing direction for each of said antennas, means at said computation center responsive both to said momentary and to said desired pointing direction signals for developing data signals which define for specified future instants the required pointing directions for enabling each of said antennas to attain said desired pointing direction, means for periodically supplying said data signals to each of said stations, means at each of said stations for interpolating between said required pointing directions defined for said specified future instants to produce control signals which define at other selected times the required pointing direction of said antenna at said station, and means at each of said control stations for supplying said control signals to said antenna pointing means.

3. An antenna pointing system as defined in claim 2 wherein said stations and said computation center are geographically separated from one another, and in which both said means for supplying said computation center with signals and said means for periodically supplying data signals to each of said stations include a signal transmission network.

4. A system for tracking an earth satellite which comprises: a plurality of tracking control stations, each of said stations being equipped with at least one tracking antenna, means for training each of said antennas on an orbiting satellite, means associated with each of said antennas for generating tracking data as said antenna follows a satellite; a computation center; means for supplying said computation center with predicted ephemeris of each one of a number of earth satellites; means for supplying said computation center with data developed at each of said ground stations in tracking each one of said number of satellites; means at said computation center for developing from the data supplied thereto tracking data defining the position of each of said satellites with relation to each of said tracking control stations, at selected future times, means for periodically transmitting said tracking data for each one of said satellites to each one of said control stations; and, at each of said control stations, means for storing said tracking data, means for interpolating between said defined satellite positions at said selected times to produce signals defining the position of a tracking antenna at that station, at selected times, and means responsive to said position defining signals for actuating said antenna training means.

5. A system for tracking an earth satellite which comprises: a plurality of tracking control stations, each of said stations being equipped with at least one tracking antenna, means for training each of said antennas on an orbiting satellite, means associated with each of said antennas for generating tracking data as said antenna follows a satellite; a computation center; means for supplying said computation center with predicted ephemeris of each one of a number of earth satellites; means for supplying said computation center with data developed at each of said ground stations in tracking each one of said number of satellites; means at said computation center for developing from the data supplied thereto tracking data defining the position of each of said satellites with relation to each of said tracking control stations, means for transmitting said tracking data for each one of said satellites to each one of said control stations; and, at each of said control stations, means for storing said tracking data, means for processing said tracking signals to produce signals defining future positions of a tracking antenna at that station, and means responsive to said position defining signals for actuating said antenna training means.

6. In combination: a plurality of tracking control stations geographically separated from one another; at least one tracking antenna at each of said stations; means for individually training each of said antennas on a selected orbiting earth satellite; means at each of said stations for generating pointing signals which define the actual momentary positions of each antenna at said station; a computation center; transmission means for supplying said computation center with pointing signals generated at all of said stations; means at said computation center for developing, from said pointing signals and from an ephemeris, position signals which define the position of each of said satellites with relation to each of said tracking control stations; transmission means for supplying said position signals to each one of said control stations; and, at each of said control stations, means for interpolating between selected position signals to produce path signals which define the positions of specified earth satellites at future times; and means responsive to said path signals for actuating each of said antenna training means.

7. In combination: a plurality of tracking control stations geographically separated from one another; at least one tracking antenna at each of said stations; means for individually training each of said antennas on a selected orbiting earth satellite; means at each of said stations for generating pointing signals which define the actual momentary positions of each antenna at said station; a computation center; transmission means for supplying said computation center with pointing signals generated at all of said stations; means at said computation center for developing from said pointing signals and from an ephemeris, position signals which define the position of each of said satellites with relation to each of said tracking control stations at selected future times; transmission means for periodically supplying said position signals to each one of said control stations; and, at each of said control stations, means for processing said position signals to produce path signals which define the positions of specified earth satellites at future times; and means responsive to said path signals for actuating each of said antenna training means.

8. In combination: a plurality of tracking control stations geographically separated from one another and each including, at least one tracking antenna, means for individually training each of said antennas on a selected orbiting earth satellite, and means for generating pointing signals which define the actual momentary positions of each antenna; a computation center functionally common to all of said stations which includes, means for receiving pointing signals from all of said stations, means for storing the ephemeris of selected earth satellites, means for developing position signals from said pointing signals and from said ephermeris which define the position of each of said satellites with relation to each of said tracking control stations at selected future times, and means for transmitting said position signals to each one of said control stations; and, at each of said control stations, means for transmitting pointing signals to said common computation center, means for receiving position signals from said computation center, means for interpolating between selected position signals to produce path signals which define the positions of specified earth satellites at future times, and means responsive to said path signals for actuating each of said antenna training means.

No references cited.

RODNEY D. BENNETT, *Primary Examiner.*

CHESTER L. JUSTUS, *Examiner.*

D. C. KAUFMAN, *Assistant Examiner.*